(12) United States Patent
Chen et al.

(10) Patent No.: US 7,929,851 B2
(45) Date of Patent: Apr. 19, 2011

(54) CAMERA MODULE WITH SELECTABLE IMAGING UNITS AND METHOD FOR SWITCHING IMAGING CAPABILITY OF CAMERA MODULE

(75) Inventors: Yen-Chun Chen, Taipei Hsien (TW); Sheng-Jung Yu, Taipei Hsien (TW); Hou-Yao Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/701,707

(22) Filed: Feb. 8, 2010

(65) Prior Publication Data

US 2010/0239238 A1    Sep. 23, 2010

(30) Foreign Application Priority Data

Mar. 21, 2009 (CN) .......................... 2009 1 0301018

(51) Int. Cl.
*G03B 17/00* (2006.01)
*G03B 7/099* (2006.01)

(52) U.S. Cl. ......................................... 396/73; 396/270

(58) Field of Classification Search .................... 396/73, 396/270

See application file for complete search history.

(56) References Cited

U.S. PATENT DOCUMENTS

| 7,471,887 | B2* | 12/2008 | Nomura | 396/55 |
| 7,509,041 | B2* | 3/2009 | Hosono | 396/60 |
| 2009/0009650 | A1* | 1/2009 | Liu et al. | 348/340 |
| 2009/0167926 | A1* | 7/2009 | Westerweck et al. | 348/345 |
| 2010/0265328 | A1* | 10/2010 | Chou | 348/143 |
| 2010/0284683 | A1* | 11/2010 | Fressola et al. | 396/429 |

\* cited by examiner

*Primary Examiner* — Rodney E Fuller
(74) *Attorney, Agent, or Firm* — Raymond J. Chew

(57) ABSTRACT

A camera module includes a first lens assembly, a second lens assembly, an image sensor module, a first driving device and a second driving device. The first lens assembly is positioned on an optical axis of the camera module. The second lens assembly is coaxially aligned with the first lens assembly and movable along the optical axis. The image sensor module includes a first image sensor and a second image sensor at opposite sides thereof. The first driving device is for driving the second lens assembly to move backward and forward along the optical axis. The second driving device is for driving the image sensor module to move down and up along directions nonparallel to the optical axis.

20 Claims, 4 Drawing Sheets

CAMERA MODULE WITH SELECTABLE IMAGING UNITS AND METHOD FOR SWITCHING IMAGING CAPABILITY OF CAMERA MODULE

BACKGROUND

1. Technical Field

The present disclosure relates to optical imaging devices and methods, and particularly to a camera module with selectable imaging units and a method for switching the imaging capability of such a camera module.

2. Description of Related Art

With ongoing developments in microcircuitry and multimedia technology, camera modules have become widely used in a variety of consumer electronic devices, such as cellular telephones, notebook computers, digital cameras, personal digital assistants (PDAs), etc. A typical camera module includes at least one lens module and an image sensor. In addition, there is a growing demand for developing more camera modules with multiple functions, such as camera modules having selectable lens modules with different functions. Furthermore, there is also an ongoing trend for consumer electronic devices to be more miniaturized.

A typical multi-functional camera module has a plurality of lens modules with different functions. A user can select which lens module he/she needs for a particular purpose, and physically install that lens module in the camera module. Thus the user can select different functions simply by switching between the different lens modules of the camera module. However, this system requires that one or more loose lens modules be available, and it may not be convenient for the user to have to carry around such camera module together with the such extra lens module(s).

Therefore, what is needed is a camera module, and a method for using the camera module, which can overcome the above-described shortcomings.

BRIEF DESCRIPTION OF THE DRAWINGS

Many aspects of the present camera module can be better understood with reference to the following drawings. The components in the drawings are not necessarily to scale, the emphasis instead being placed upon clearly illustrating the principles of the camera module. Moreover, in the drawings, like reference numerals designate corresponding parts throughout the several views.

DETAILED DESCRIPTION

Reference will now be made to the drawings to describe in detail preferred and exemplary embodiments of the present camera module.

Figure 1:
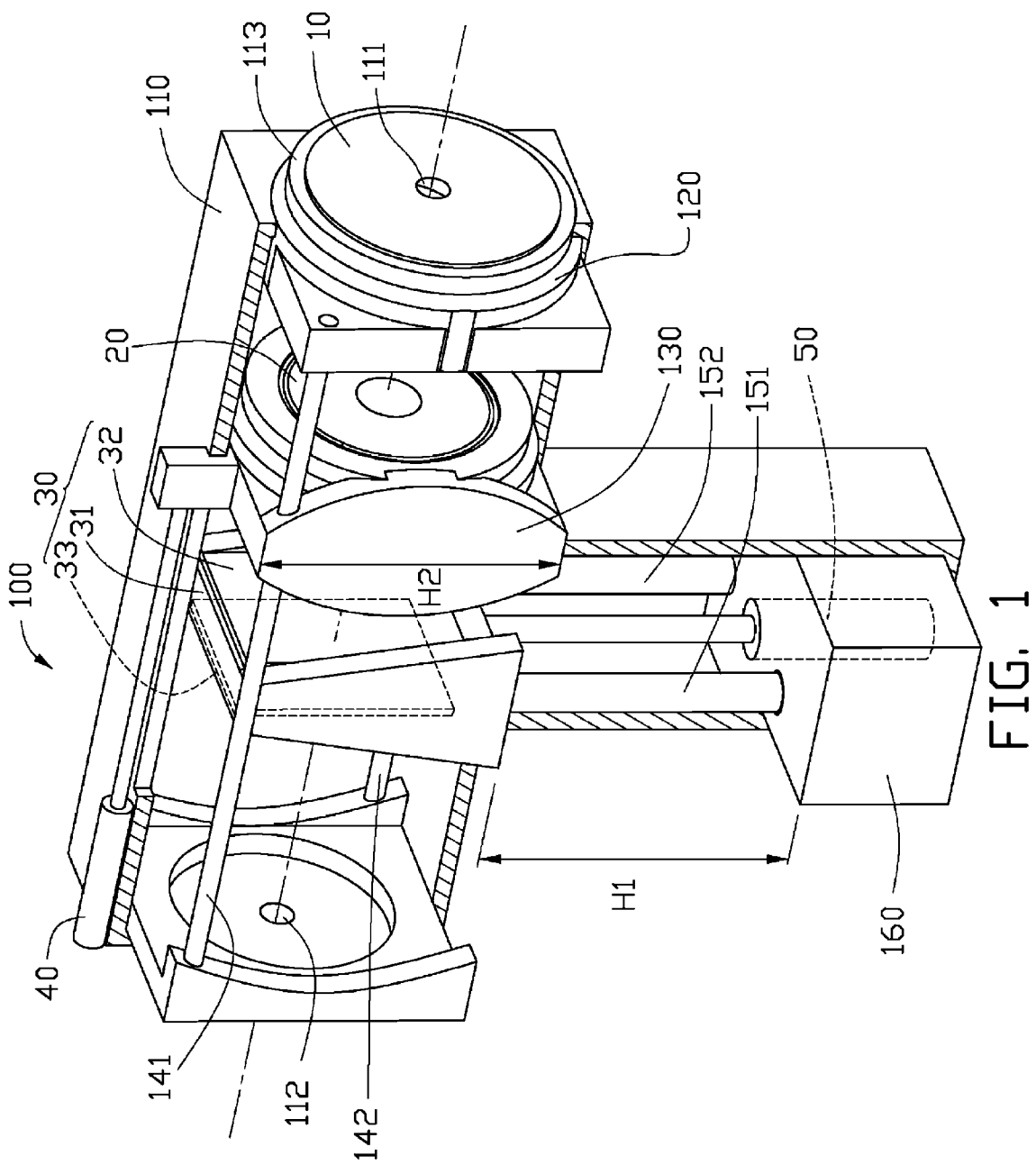
FIG. 1 is a schematic, partially cut away view of a camera module in accordance with an exemplary embodiment, the camera module having a first lens assembly, a second lens assembly and an image sensor module, showing the image sensor module in a top position.

Referring to FIG. 1, a camera module 100, in accordance with an exemplary embodiment, includes a first lens assembly 10, a second lens assembly 20, an image sensor module 30, a first driving device 40, and a second driving device 50. The first and second lens assemblies 10, 20 each are independent lens modules. The first and second lens assemblies 10, 20 can also cooperatively form a composite lens module. The image sensor module 30 includes a holder 31, a first image sensor 32, and a second image sensor 33. The first image sensor 32 and the second image sensor 33 are on opposite surfaces of the holder 31. In the present embodiment, each of the surfaces on the opposite sides of the holder 31 defines a receiving groove (not shown). The receiving grooves receive the first image sensor 32, the second image sensor 33, and corresponding sets of circuitry thereof.

The camera module 100 includes a plurality of imaging units. The first image sensor 32 has high resolution, and the second image sensor 33 has low resolution. Referring to FIG. 1, the first image sensor 32, the first lens assembly 10 and the second lens assembly 20 aligned in that sequence cooperatively form a first imaging unit. The first lens assembly 10, the second lens assembly 20 and the image sensor module 30 can be aligned along an optical axis of the camera module 100.

Figure 2:
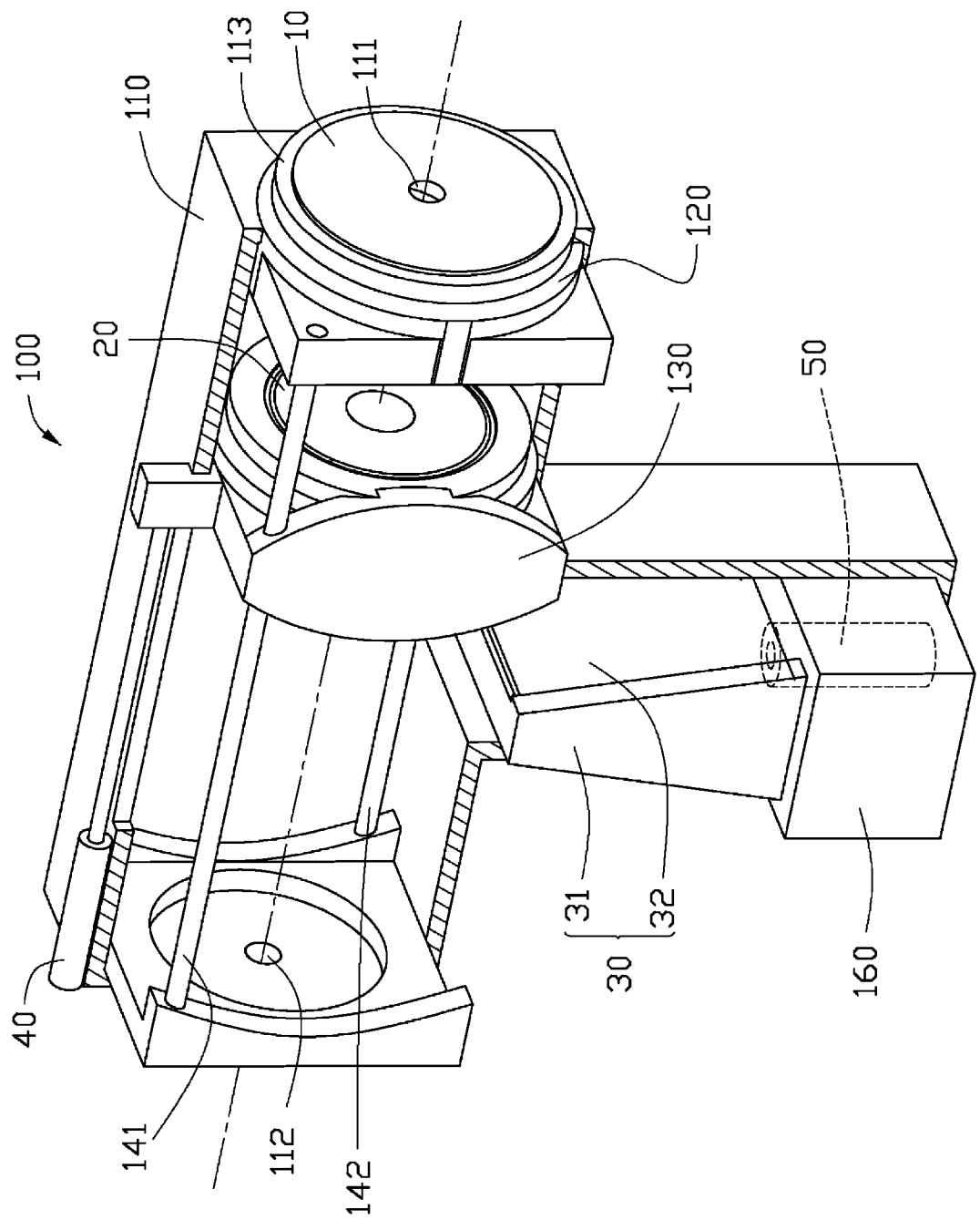
FIG. 2 is similar to FIG. 1, but showing the image sensor module moved to a bottom position.
Figure 3:
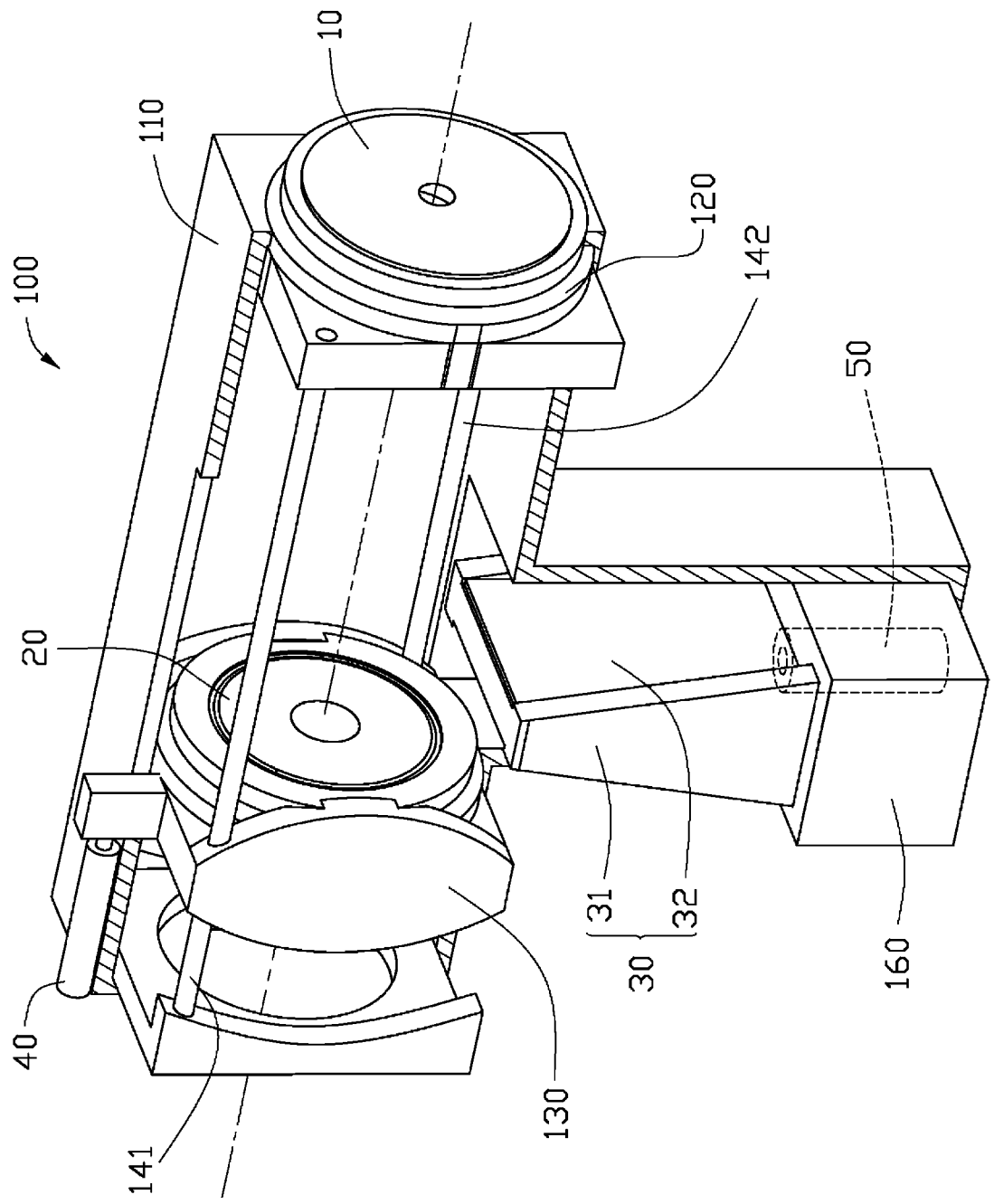
FIG. 3 is similar to FIG. 2, but showing the second lens assembly moved far away from the first lens assembly along an optical axis of the camera module.

The second driving device 50 is capable of driving the image sensor module 30 to move up and down along a direction perpendicular to the optical axis of the camera module 100 (see FIG. 2). The first driving device 40 is capable of driving the second lens assembly 20 to move forward or backward along the optical axis (see FIG. 3). As a result, the image sensor module 30 can be positioned between the first lens assembly 10 and the second lens assembly 20 (see FIG. 4). In this state, the first lens assembly 10, the image sensor module 30 and the second lens assembly 20 are arranged in that sequence along the optical axis. The second lens assembly 20 and the second image sensor 33 cooperatively form a second imaging unit. The first lens assembly 10 and the first image sensor 32 cooperatively form a third imaging unit. That is, the camera module 100 has a total of three image capturing modes. Each of the three modes correspondingly adopts the first imaging unit, the second imaging unit, or the third imaging unit to provide different imaging features for the camera module 100. A highly integrated package of different image capturing modes in the single camera module 100 is thus achieved.

The camera module 100 includes a housing 110 configured for receiving the first lens assembly 10, the second lens assembly 20, and the image sensor module 30. The housing 110 is substantially T-shaped. The top horizontal portion of the T-shape of the housing 110 is hereinafter referred to as a "drum," and the vertical portion of the T-shape of the housing 110 is hereinafter referred to as a "stand." The drum has a first end and an opposite second end. The first end has a first aperture 111 defined therein. The second end has a second aperture 112 defined therein. The camera module 100 further includes two shutters: a first shutter 113 arranged around the first aperture 111, and a second shutter 114 arranged around the second aperture 112. The first shutter 113 and the second shutter 114 are controlled by a main circuit board (not shown) of the camera module 100. That is, when the first image sensor 32 is selected for use, the first shutter 113 is opened, and the second shutter 114 is closed. Light enters the drum through the first aperture 111, and light cannot enter the drum through the second aperture 112. Alternatively, when the second image sensor 33 is selected for use, the second shutter 114 is opened and the first shutter 113 is closed. Light enters the drum through the second aperture 112, and light cannot enter the drum through the first aperture 111. Consequently, the camera module 100 can have the three modes of image capturing, which are all independent of each other.

The camera module 100 also includes a first barrel 120 and a second barrel 130 configured for respectively receiving the first lens assembly 10 and the second lens assembly 20.

The camera module 100 also includes a first shaft 141 and a second shaft 142. The first and second shafts 141, 142 are parallel to the optical axis of the camera module 100 and fixed to the two ends of the drum of the housing 110. The first and second shafts 141, 142 extend through the second barrel 130 such that the second barrel 130 is movable along the first and second shafts 141, 142.

The camera module 100 also includes a third shaft 151 and a fourth shaft 152. The third and fourth shafts 151, 152 are received in the stand of the housing 110, and are perpendicular to the optical axis of the camera module 100. The holder 31 is disposed on top of the third and fourth shafts 151, 152, such that the image sensor module 30 is movable down and up along lengthwise directions of the third and fourth shafts 151, 152.

The camera module 100 also includes a base 160. The base 160 is received in the stand of the housing 110. Bottom ends of the third and fourth shafts 151, 152 are fixed to the base 160.

The first driving device 40 and the second driving device 50 are both linear motor actuators. They can instead be other suitable types of mechanical actuators.

The first driving device 40 is fixed on an outer top wall of the drum of the housing 110. The second driving device 50 is fixed in the base 160. The fixing configurations of the first and second driving devices 40, 50 are not limited to those of the illustrated embodiment. Any other suitable kinds of fixing configurations and arrangements can be applied in the camera module 100.

The camera module 100 may further include a third driving device (not shown). The third driving device can drive the first lens assembly 10 to move back and forth along the optical axis to focus the camera module 100.

A method for switching the imaging capability of the camera module 100 is also provided. The method includes the following steps:

Firstly, the image sensor module 30 is driven by the second driving device 50 to move down from an initial top position (the position where the image sensor module 30 is on the optical axis) along the direction perpendicular to the optical axis to an interim bottom position. The vertical distance H1 that the image sensor module 30 travels is at least the height H2 of the second lens assembly 20 (see FIGS. 1-2).

Secondly, the second lens assembly 20 is driven by the first driving device 40 to move away from an initial position near the first lens assembly 10 along the optical axis to a new position where the second lens assembly 20 is far away from the first lens assembly 10. More particularly, in the initial position, the second lens assembly 20 is at a first side of a middle of the drum of the housing 110, which first side corresponds to the first image sensor 32 of the image sensor module 30 when the image sensor module 30 is in the top position (see FIG. 2). In the new position, the second lens assembly 20 is at a second side of the middle of the drum of the housing 110, which second side corresponds to the second image sensor 33 of the image sensor module 30 when the image sensor module 30 is in the top position (see FIG. 3).

Figure 4:
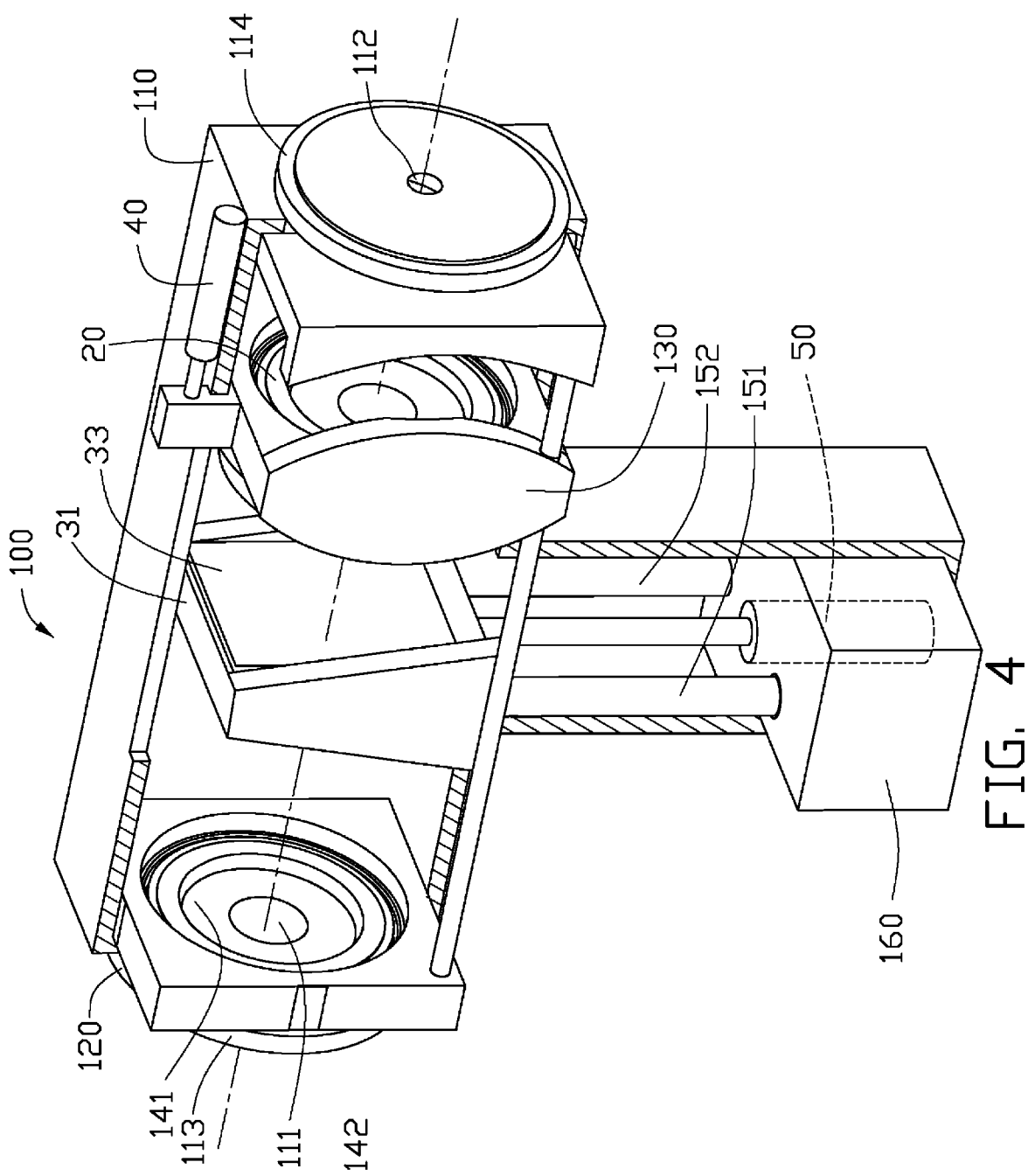
FIG. 4 is a schematic, partially cut away view of the camera module of FIG. 3, but viewed from another aspect, and showing the image sensor module moved back up to the top position.

Thirdly, the image sensor module 30 is driven by the second driving device 50 to move up along the direction perpendicular to the optical axis, and return to the initial position (see FIG. 4).

Thus, the image sensor module 30 is arranged between the first lens assembly 10 and the second lens assembly 20. The second lens assembly 20 and the second image sensor 33 cooperatively form the second imaging unit. The first lens assembly 10 and the first image sensor 32 cooperatively form the third imaging unit.

While preferred or exemplary embodiments have been described, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A camera module comprising:
a first lens assembly positioned on an optical axis of the camera module;
a second lens assembly coaxially aligned with the first lens assembly and movable along the optical axis;
an image sensor module comprising a first image sensor and a second image sensor at opposite sides thereof;
a first driving device structured and arranged for driving the second lens assembly to move backward and forward along the optical axis; and
a second driving device structured and arranged for driving the image sensor module to move down and up along directions nonparallel to the optical axis, wherein when the image sensor module is positioned below the first and second lens assemblies the second lens assembly is free to move along the optical axis and switch between a first position and a second position, the first position corresponding to a first state of the camera module and the second position corresponding to a second state of the camera module, the first state being where the second lens assembly is located between the first lens assembly and the image sensor module and the first image sensor detects light from the first and second lens assemblies, and the second state being where the image sensor module is located between the first lens assembly and the second lens assembly and the first image sensor detects light from the first lens assembly and the second image sensor detects light from the second lens assembly.

2. The camera module as claimed in claim 1, further comprising a housing, the first lens assembly, the second lens assembly and the image sensor module being received in the housing.

3. The camera module as claimed in claim 2, wherein the housing comprises a first end having a first aperture defined therein, and an opposite second end having a second aperture defined therein.

4. The camera module as claimed in claim 3, further comprising a first shutter arranged at the first aperture and a second shutter arranged at the second aperture, wherein each of the first shutter and the second shutter is selectively open or closed, so as to selectively expose or cover the first aperture and the second aperture.

5. The camera module as claimed in claim 2, further comprising a first barrel and a second barrel, the first lens assembly and the second lens assembly being respectively received in the first barrel and the second barrel.

6. The camera module as claimed in claim 5, further comprising a first shaft and a second shaft both being parallel to the optical axis of the camera module and fixed to the two ends of the housing, the first and the second shafts extending through the second barrel such that the second barrel is movable along the first and second shafts.

7. The camera module as claimed in claim 6, further comprising a third and a fourth shafts both being substantially perpendicular to the optical axis of the camera module, the image sensor module being disposed on the third and fourth shafts such that the image sensor module is movable down and up along the third and fourth shafts.

8. The camera module as claimed in claim 7, further comprising a base received in the housing, the third and fourth shafts being fixed to the base.

9. The camera module as claimed in claim 1, wherein the first and second driving devices are linear motor actuators.

10. The camera module as claimed in claim 1, further comprising a holder, the holder comprising two opposite surfaces, the first image sensor and the second image sensor being respectively arranged at the two surfaces of the holder.

11. A method for switching imaging capability of a camera module, the method comprising:
  providing a camera module comprising:
    a first lens assembly positioned on an optical axis of the camera module;
    a second lens assembly coaxially aligned with the first lens assembly and movable along the optical axis;
    an image sensor module comprising a first image sensor and a second image sensor at opposite sides thereof;
    a first driving device for driving the second lens assembly to move backward or forward along the optical axis; and
    a second driving device for driving the image sensor module to move down or up along directions nonparallel to the optical axis;
  defining a first state of the camera module in which the second lens assembly is located between the first lens assembly and the image sensor module and the first image sensor detects light from the first and the second lens assemblies, and a second state of the camera module in which the image sensor module is located between the first lens assembly and the second lens assembly and the first image sensor detects light from the first lens assembly and the second image sensor detects light from the second lens assembly;
  driving the second lens assembly by the first driving device to move between one of a first position in which camera module is in the first state and a second position in which camera module is in the second state to the other of the first position and the second position; and
  driving the image sensor module by the second driving device to move up to a top position, wherein in the top position the camera module is in said other of the first position and the second position.

12. The method as claimed in claim 11, further comprising driving the image sensor module by the second driving device to move down to a bottom position before driving the second lens assembly.

13. The method as claimed in claim 11, wherein the camera module further comprises a housing, with the first lens assembly, the second lens assembly and the image sensor module being received in the housing.

14. The method as claimed in claim 13, wherein the housing comprises a first end having a first aperture defined therein, and an opposite second end having a second aperture defined therein.

15. The method as claimed in claim 14, wherein the camera module further comprises a first shutter arranged at the first aperture and a second shutter arranged at the second aperture, and the first shutter and the second shutter are open or closed, so as to selectively expose or cover the first aperture and the second aperture.

16. The method as claimed in claim 15, wherein the camera module further comprises a third shaft and a fourth shaft both being substantially perpendicular to the optical axis of the camera module, the image sensor module being disposed on the third and fourth shafts such that the image sensor module is movable along lengthwise directions of the third and fourth shafts.

17. The method as claimed in claim 16, wherein the camera module further comprises a base received in the housing, the third and fourth shafts being fixed to the base.

18. The method as claimed in claim 14, wherein the camera module further comprises a first shaft and a second shaft both being parallel to the optical axis of the camera module and fixed to the two ends of the housing, the first and the second shafts extending through the second barrel such that the second barrel is movable along the first and second shafts.

19. The method as claimed in claim 13, wherein the camera module further comprises a first barrel and a second barrel, the first lens assembly and the second lens assembly being respectively received in the first barrel and the second barrel.

20. The method as claimed in claim 11, wherein the image sensor module further comprises a holder, the holder comprising two opposite surfaces, the first and the second image sensors being respectively arranged at the two surfaces of the holder.

* * * * *